United States Patent [19]

Pennoni

[11] Patent Number: 4,591,730
[45] Date of Patent: May 27, 1986

[54] MASTER CLOCK GENERATOR FOR TELECOMMUNICATIONS SYSTEM

[75] Inventor: Giovanni Pennoni, Oegstgeest, Netherlands

[73] Assignee: Agence Spatiale Europeenne, Paris, France

[21] Appl. No.: 677,551

[22] Filed: Jul. 22, 1983

[30] Foreign Application Priority Data

Aug. 6, 1982 [FR] France ................ 82 13780

[51] Int. Cl.⁴ .................. H04J 3/06; H03D 3/24
[52] U.S. Cl. ............................. 370/104; 375/120
[58] Field of Search ............ 370/104, 100; 375/120; 358/19; 331/1 A; 455/12

[56] References Cited

U.S. PATENT DOCUMENTS 3,818,453  8/1971  Schmidt et al. ............... 370/104
4,232,197  11/1980  Acampora et al. ............... 455/12

Primary Examiner—Jin F. Ng
Assistant Examiner—Elissa Seidenglanz
Attorney, Agent, or Firm—McCormick, Paulding & Huber

[57] ABSTRACT

A very stable master clock for satellites is disclosed. Time division multiple access techniques are used to permit individual earth stations to be received by the satellite in separate non-overlapping time slots. The satellite switched time division multiple access systems are compatible with the onboard satellite clock by providing a comparator control logic loop to produce a signal representing the phase difference between the onboard oscillator clock and the earth station. Control signals are generated to correct the voltage controlled oscillator onboard the satellite.

1 Claim, 3 Drawing Figures

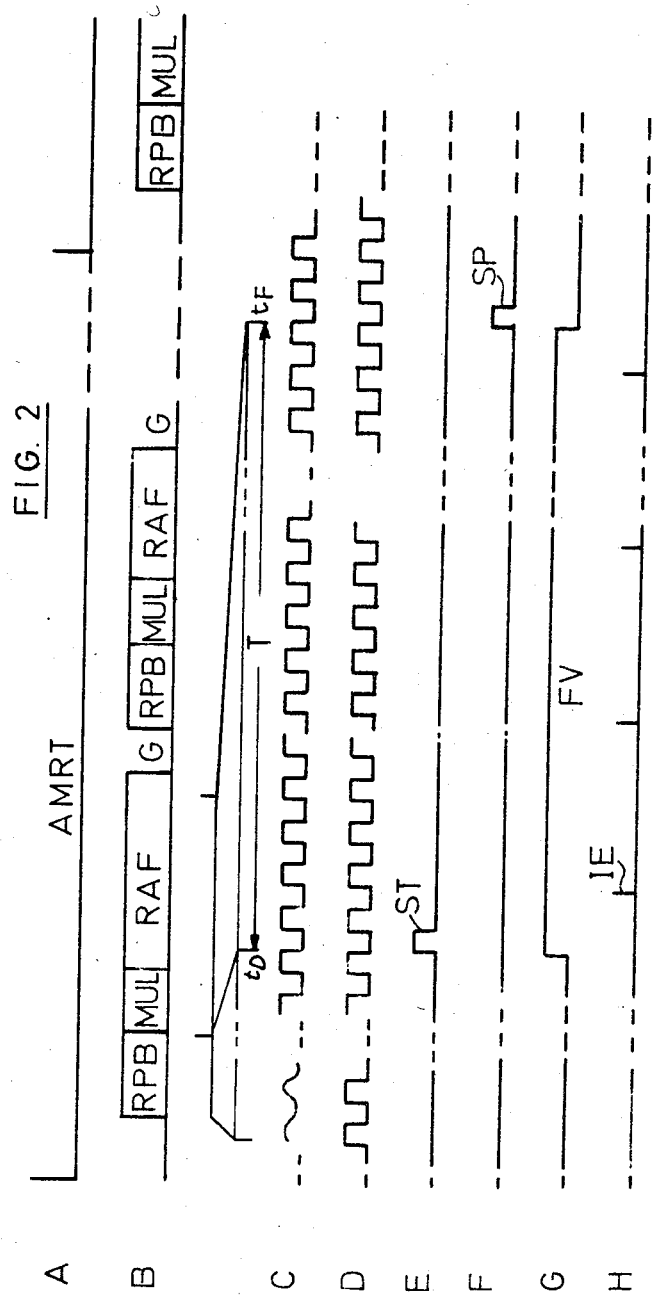

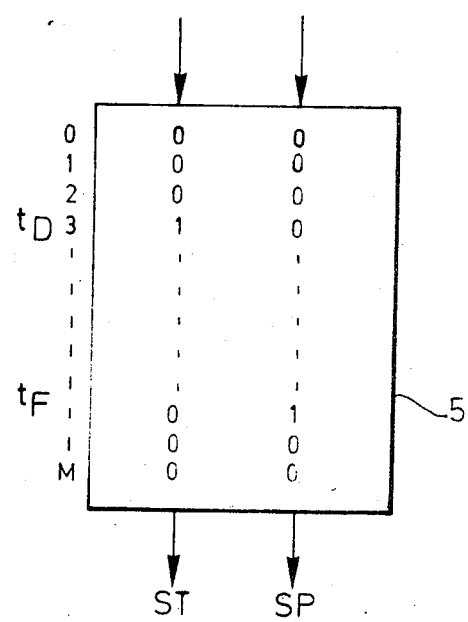

MASTER CLOCK GENERATOR FOR TELECOMMUNICATIONS SYSTEM

BACKGROUND OF THE INVENTION

The present invention relates to the provision of a highly stable master clock to supply the timing in a time division multiple access (TDMA) system. In the following the application of the invention to baseband processing satellite switched TDMA systems will be described, but this does not exclude its application to TDMA systems in general.

Time division multiple access (TDMA) is a multiple access technique that permits individual earth terminal transmissions to be received by a satellite in separate non-overlapping time slots. Each TDMA earth station has parallel input digital bitstreams, or analog streams that are digitized at the earth station, which are addressed to separate receiving earth stations. The signals being addressed to these stations are allocated separate portions of the transmit TDMA burst following the TDMA burst preamble.

Most communication satellites simply relay the received TDMA signal, the only signal processing operations being filtering, amplification and frequency shift. With the advent however of satellites equipped with spot beam antennas, it has become necessary to install onboard switching matrices capable of transferring uplink bursts, addressed to a specific ground station, to the appropriate spot beam antenna. These systems are referred to as satellite switched TDMA systems or, briefly, SS-TDMA. The satellite switching operations involved are either carried out at intermediate frequency or at baseband. Baseband switching has the advantage that the TDMA signal can be stored and thus the TDMA frame can be reorganized prior to transmission.

One of the major problems in interconnecting SS-TDMA systems with ground networks consists in the provision of a highly stable reference clock. In the future, national ground networks will be synchronous. This means that an SS-TDMA satellite payload for national interconnections must track the national clock to allow synchronous interconnections. Furthermore, interconnections between different national synchronous networks require an onboard master clock having a long term stability of $10^{-11}$, giving one PCM frame slip (125 microsec) per 72 day, as stipulated by recommendation G 811 "Plesiochronous Operation of International Digital Links" (CCITT Orange Book, Vol. III-2, 1977).

DESCRIPTION OF THE PRIOR ART

The requirement for a highly accurate onboard clock in SS-TDMA systems can be met by an onboard atomic clock. The drawbacks of using such a device are penalties in spacecraft weight, power and reliability and therefore such a solution does not have preference.

Other methods for providing a highly stable onboard clock are all based on correction of an onboard voltage controlled crystal oscillator (VCXO). One of these is described by T. Inukai and S. J. Campanella ("Onboard Clock Correction for SS-TDMA and Baseband Processing Satellites", COMSAT Technical Review, 11 (1981) No. 1, p. 77–101). According to this publication, a master earth station makes measurements of onboard clock frequency error and as a result transmits telecommand signals to the satellite for correcting the VCXO. There is consequently a double interacting control loop, with the master station locked to the satellite clock, and the satellite clock rate being controlled by the master station. There is scope for this to go unstable, especially in case of failures leading to parameter changes in the loops. Therefore, a robust control law must be selected.

Another method for onboard clock correction mentioned by T. Inukai ("Optimal Onboard Clock Control" IEEE Conference Preprint WP 3383/M7, 1981) consists in drift control by phase locking the VCXO to a reference signal transmitted from the ground. This method is rather vulnerable to transmission link interference since one clock slip may cause a loss of synchronization and a subsequent system outage.

In the case of both methods cited, the long term stability of an earth station high-stability clock is locked to the VCXO, via ground-to-satellite links, which requires the installation of complex equipment both on earth and onboard, as well as additional provisions in case of link failure. In addition, since both methods imply the dependence of onboard clock stability on one master earth station providing the reference terrestrial clock, thus meeting the requirement for synchronous interconnection, this does not necessarily mean that the plesiochronous interconnection requirements are met at the same time.

SUMMARY OF THE INVENTION

It is the object of the present invention to provide a highly stable onboard master clock which meets the stability requirements for both synchronous interconnection and plesiochronous interconnection in baseband processing satellite-switched TDMA systems. This is achieved by an onboard clock which is locked to a selected uplink burst clock, thus meeting the requirement for synchronous interconnection, such onboard clock having the same stability as the burst clock from which it is extracted (i.e. $10^{-11}$). The method upon which the invention is based does not require any additional ground equipment, and the onboard equipment required is relatively simple and modest in terms of weight.

The master clock according to the invention comprises a phase-locked loop for detecting phase differences between consecutive burst signals and controlling a voltage controlled crystal oscillator (VCXO), in combination with programmable control logic providing the timing signals for operation of the burst mode phase locked loop.

BRIEF DESCRIPTION OF THE DRAWINGS

FIG. 2 is a timing diagram serving to explain the operation of the generator according to the invention;

FIG. 3 illustrates the content of the random access memory in the generator of FIG. 1.

DESCRIPTION OF THE PREFERRED EMBODIMENT

Figure 1:
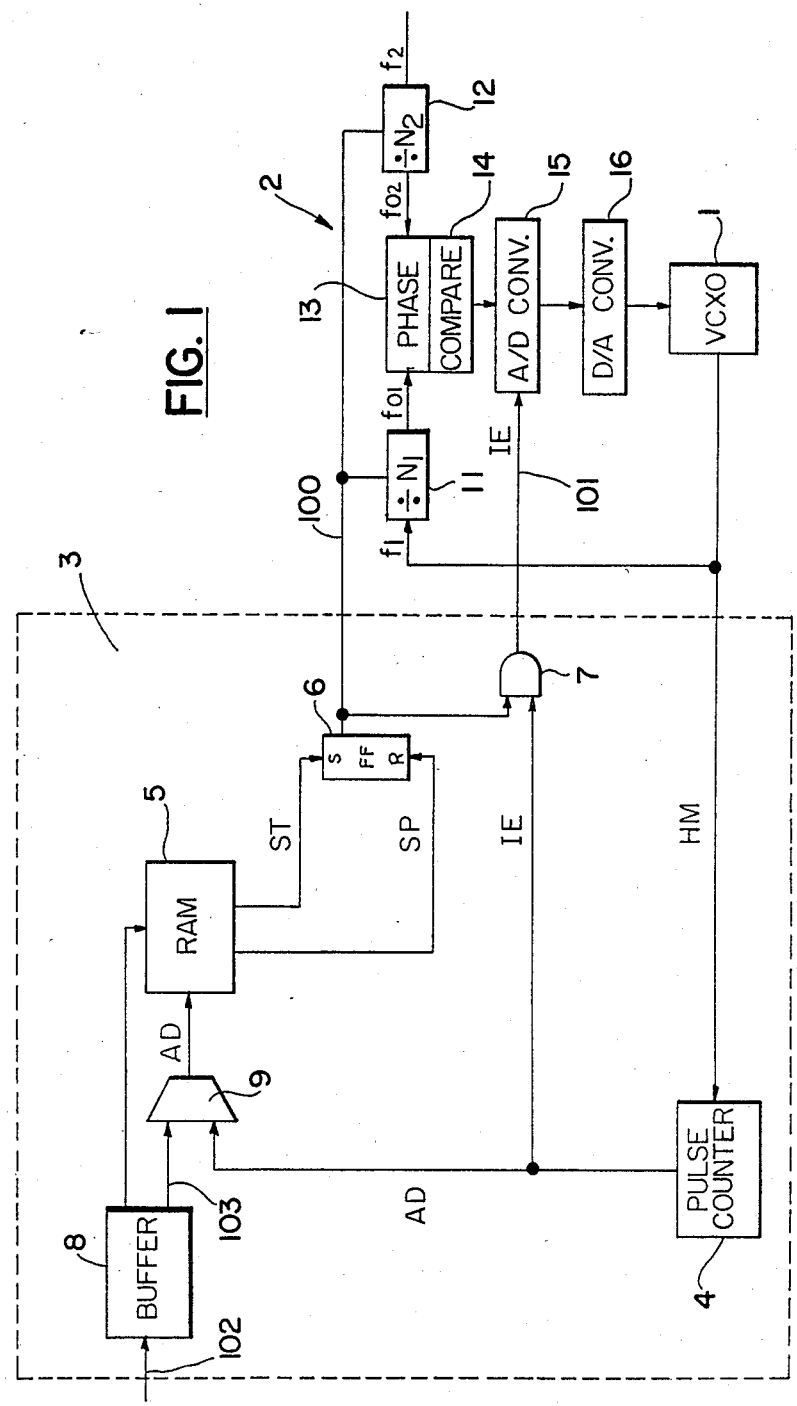
FIG. 1 is a block diagram of the preferred embodiment of the master clock generator according to the present invention.

Referring to FIG. 1, the master clock generator comprises a voltage controlled crystal oscillator (VCXO) 1 with a burst mode phase-locked loop (PLL) 2 for controlling the VCXO frequency and a programmable control logic having the function of providing the timing pulses to control the burst mode PLL 2. The control logic 3 is comprised of pulse counter 4 connected to count the signals from the VCXO 1, a random accessor memory (RAM) 5, a flip-flop 6, an AND-gate 7, an updating interface 8 and an electronic gate 9.

The phase-locked loop 2 is arranged to detect the phase differences between the timing pulses of frequency $f_1$ produced by the oscillator 1 and burst signals of frequency $f_2$. The burst signals are provided for instance from an onboard automatic switching unit connected to one of the TDMA demodulators in the case of a baseband processing SS-TDMA system. The frequencies $f_1$ and $f_2$ are divided by integers $N_1$ and $N_2$ respectively in the dividers 11 and 12 to produce signals $f_{01}$ and $f_{02}$ having almost the same frequency but which can be different in phase.

The signals $f_{01}$ and $f_{02}$ are applied to the phase comparator 13 which detects their phase difference. A detected phase difference results in an analog signal at the comparator output.

After filtering by loop filter 14 this analog signal is applied to an analog-to-digital converter 15 in which it is sampled at instants defined by sampling pulses IE coming from the pulse counter 4 via the AND-gate 7 and line 101. The pulse counter 4 is connected to the output of oscillator 1 and is thus driven by the master clock pulses HM. In the analog-to-digital converter 15 the digitized pulses are buffered and then converted back to analog form by a digital-to-analog converter 16 to drive the VCXO 1, thereby to provide master clock correction.

The operation of the master clock generator is now described with reference to the timing diagram of FIG. 2. In this diagram, the different lines represent:
A: a frame period of burst traffic
B: the composition of the uplink frame format, in which
    RPB: denotes the bit carrier recovery interval
    MUL: denotes a local unique word
    RAF: denotes an earth station burst
    G: denotes a guard interval
C: the burst clock signal
D: the master clock signal
E: a frame start pulse
F: a frame end pulse
G: an enabling signal
H: sampling pulses The phase-locked loop 2 is controlled by the sampling pulses IE during the time of succeeding enabling signals FV which correspond each to the period of one burst frame T comprising the burst RAF from an earth station including the local unique word MUL. The frame period of burst traffic is divided into a number of equal time slots. The RAM 5 defines the start and end times of each frame period T. In order to realize this, the RAM 5 (FIG. 3) stores a logic 0 for each time slot except for the start and end time slots, denoted $t_D$ and $t_F$ respectively, for which a logic 1 is stored. The column denoted by the code ST is assigned to the identification of the start time of a frame period and the column denoted by the code SP is assigned to the identification of the end time of a frame period. The RAM 5 is read under control of an address signal AD received from the pulse counter 4 through gate 9. The logic 1 signal read for the time slot $t_D$ is applied as a pulse ST to the set input of the flip-flop 6 and the logic 1 signal read for the time slot $t_F$ is applied as a pulse SP to the reset input of the flip-flop 6. The period between the positive-going flanks of these two pulses ST and SP defines the PLL updating window and within said updating window the flip-flop 6 applies an enable signal FV on line 100.

The enable signal FV enables the frequency dividers 11 and 12 in the loop 2 whereby the comparator 13 therein can detect the phase differences between the clock signals from the onboard VXCO 1 and the burst signals received during the corresponding burst frame period.

Updating of the random access memory 5 is possible by transmitting information via telemetry and telecommand or data link and the RAM updating interface 8 to define the addresses of the start and end pulses which are entered via line 103 and the electronic gate 9.

It is to be understood that the programmable control logic 3 can be implemented in various embodiments which are within the ability of those having ordinary skill in the art. For instance, instead of using a random access memory as in the embodiment described in the foregoing, the control logic could use counting devices to detect the start and end time slots of the frame and define the updating window of the phase-locked loop 2.

What is claimed is:

1. An onboard master clock generator for time-division multiple-access telecommunications system, comprising a voltage controlled oscillator, a phase-locked loop having a first input connected to accept the signals produced by said oscillator and a second input connected to accept a consecutive burst clock signal received from an earth station, said phase locked loop including means responding to an enable signal for detecting the phase difference between the oscillator signals and the burst clock signals, and said phase-locked loop producing a control signal for said oscillator, programmable control logic means to indicate the start and the end of each burst frame period and to produce said enable signal for controlling the phase-locked loop during each frame period, said phase-locked loop including phase comparator means connected to compare the oscillator signals and the burst signals and to produce a signal representing the phase difference between the input signals thereto, and an analog-to-digital converter controlled by sampling signals to sample the phase difference signals and to produce control signals, and a digital-to-analog converter to convert each control signal into an analog signal for controlling said oscillator.

* * * * *